US011991295B2

(12) United States Patent
Melnik (10) Patent No.: US 11,991,295 B2
(45) Date of Patent: May 21, 2024

(54) METHOD, APPARATUS, AND COMPUTER PROGRAM PRODUCT FOR IDENTIFYING AN OBJECT OF INTEREST WITHIN AN IMAGE FROM A DIGITAL SIGNATURE GENERATED BY A SIGNATURE ENCODING MODULE INCLUDING A HYPERNETWORK

(71) Applicant: HERE GLOBAL B.V., Eindhoven (NL)

(72) Inventor: Ofer Melnik, Weehawken, NJ (US)

(73) Assignee: HERE GLOBAL B.V., Eindhoven (NL)

( * ) Notice: Subject to any disclaimer, the term of this patent is extended or adjusted under 35 U.S.C. 154(b) by 291 days.

(21) Appl. No.: 17/544,039

(22) Filed: Dec. 7, 2021

(65) Prior Publication Data

US 2023/0179426 A1 Jun. 8, 2023

(51) Int. Cl.
*H04L 9/32* (2006.01)
*G06F 21/60* (2013.01)
*G06N 3/02* (2006.01)

(52) U.S. Cl.
CPC .......... *H04L 9/3247* (2013.01); *G06F 21/602* (2013.01); *G06N 3/02* (2013.01)

(58) Field of Classification Search
CPC ........ H04L 9/3247; G06F 21/602; G06N 3/02
See application file for complete search history.

(56) References Cited

U.S. PATENT DOCUMENTS

| 8,131,118 | B1 | 3/2012 | Jing et al. |
| 8,625,902 | B2 | 1/2014 | Baheti et al. |
| 9,292,509 | B2 * | 3/2016 | Betz ..................... G06F 16/93 |
| 10,452,071 | B1 | 10/2019 | Ebrahimi et al. |

(Continued)

FOREIGN PATENT DOCUMENTS

| CN | 101535986 A | 9/2009 |
| CN | 110263746 A | 9/2019 |

(Continued)

OTHER PUBLICATIONS

Non-Final Office Action for U.S. Appl. No. 17/123,485 dated Jul. 25, 2023.

(Continued)

*Primary Examiner* — Cheng-Feng Huang
(74) *Attorney, Agent, or Firm* — ALSTON & BIRD LLP (57) ABSTRACT

A method, apparatus and computer program product generate and utilize a digital signature to identify an object of interest. The method includes providing a reference image depicting the object to a signature encoding module having a hypernetwork. An indication of the object within the reference image is also provided. The method includes generating, with the signature encoding module, the digital signature representing the object. The digital signature includes parameter(s) configured to define processing to be performed by another neural network. The method includes providing the digital signature and at least one query image to a query processing module having a neural network. The method includes identifying, by the query processing module, the object within the at least one query image based upon the digital signature by processing the at least one query image with the neural network of the query processing module in a manner defined by the parameter(s).

20 Claims, 4 Drawing Sheets

(56) References Cited

U.S. PATENT DOCUMENTS

| | | | |
|---|---|---|---|
| 10,726,312 | B2 | 7/2020 | Butt et al. |
| 10,916,001 | B2* | 2/2021 | Lu .......................... G06N 3/08 |
| 11,113,587 | B2 | 9/2021 | Butt et al. |
| 11,641,354 | B2* | 5/2023 | Soon-Shiong ...... H04L 63/0807 726/30 |
| 2007/0005571 | A1 | 1/2007 | Brewer et al. |
| 2011/0060666 | A1 | 3/2011 | Gromek et al. |
| 2011/0135191 | A1 | 6/2011 | Lyuh et al. |
| 2012/0027290 | A1 | 2/2012 | Baheti et al. |
| 2012/0166074 | A1 | 6/2012 | Weng et al. |
| 2012/0294520 | A1 | 11/2012 | Mei et al. |
| 2014/0133310 | A1 | 5/2014 | Pau |
| 2014/0281945 | A1 | 9/2014 | Avni et al. |
| 2015/0278224 | A1 | 10/2015 | Jaber et al. |
| 2016/0300118 | A1 | 10/2016 | Murray et al. |
| 2018/0101730 | A1 | 4/2018 | Wu |
| 2018/0137551 | A1 | 5/2018 | Zheng et al. |
| 2018/0150947 | A1* | 5/2018 | Lu .......................... G06N 3/08 |
| 2018/0157939 | A1 | 6/2018 | Butt et al. |
| 2018/0189706 | A1* | 7/2018 | Newhouse ........... G06Q 10/101 |
| 2018/0204083 | A1 | 7/2018 | Goyal et al. |
| 2018/0225514 | A1 | 8/2018 | Anastassacos et al. |
| 2018/0227482 | A1 | 8/2018 | Holzer et al. |
| 2018/0373959 | A1 | 12/2018 | Rhoads et al. |
| 2019/0073553 | A1 | 3/2019 | Yao et al. |
| 2019/0122072 | A1 | 4/2019 | Cricri et al. |
| 2019/0147655 | A1 | 5/2019 | Galera et al. |
| 2019/0272284 | A1 | 9/2019 | Jaber et al. |
| 2019/0302290 | A1 | 10/2019 | Alwon |
| 2019/0303725 | A1 | 10/2019 | Gurvich et al. |
| 2020/0005542 | A1 | 1/2020 | Kocharlakota et al. |
| 2020/0183047 | A1 | 6/2020 | Denli et al. |
| 2020/0193206 | A1 | 6/2020 | Turkelson et al. |
| 2020/0225673 | A1* | 7/2020 | Ebrahimi Afrouzi ........................ G05D 1/0044 |
| 2020/0234466 | A1 | 7/2020 | Holzer et al. |
| 2020/0320356 | A1 | 10/2020 | Butt et al. |
| 2020/0401617 | A1 | 12/2020 | Spiegel et al. |
| 2020/0402541 | A1 | 12/2020 | Talbot et al. |
| 2021/0004589 | A1 | 1/2021 | Turkelson et al. |
| 2021/0056761 | A1 | 2/2021 | Nigam et al. |
| 2021/0141793 | A1 | 5/2021 | Kar et al. |
| 2021/0174113 | A1 | 6/2021 | Shin et al. |
| 2021/0281569 | A1* | 9/2021 | Soon-Shiong .......... H04L 63/20 |
| 2021/0335050 | A1 | 10/2021 | Zavesky et al. |
| 2022/0060451 | A1* | 2/2022 | Kashyap ............... H04L 63/062 |
| 2022/0132095 | A1 | 4/2022 | Leung et al. |
| 2022/0188346 | A1 | 6/2022 | Melnik et al. |
| 2022/0198215 | A1 | 6/2022 | Melnik et al. |
| 2022/0198701 | A1 | 6/2022 | Melnik et al. |
| 2022/0198721 | A1 | 6/2022 | Melnik et al. |
| 2023/0186517 | A1 | 6/2023 | Melnik et al. |

FOREIGN PATENT DOCUMENTS

| | | |
|---|---|---|
| KR | 102266996 B1 | 6/2021 |
| WO | WO 2017/156043 A1 | 9/2017 |
| WO | WO 2018/031050 A1 | 2/2018 |
| WO | WO 2020/020472 A1 | 1/2020 |

OTHER PUBLICATIONS

Notice of Allowance for U.S. Appl. No. 17/132,911 dated Jul. 12, 2023.

Corrected Notice of Allowance for U.S. Appl. No. 17/132,911 dated Jul. 20, 2023.

Notice of Allowance for U.S. Appl. No. 17/132,860 dated Jul. 13, 2023.

Notice of Allowance for U.S. Appl. No. 17/123,935 dated Sep. 25, 2023.

Alfarrarjeh et al, "A Data-Centric Approach for Image Scene Localization", 2018 IEEE International Conference on Big Data, (Dec. 10-13, 2018), pp. 594-603.

Extended European Search Report for European Application No. 21214679.9 dated May 13, 2022, 12 pages.

Extended European Search Report for European Application No. 21214761.5 dated May 13, 2022, 12 pages.

Extended European Search Report for European Application No. 21216006.3 dated May 23, 2022, 8 pages.

Extended European Search Report for European Application No. 21216037.8 dated Jun. 7, 2022, 7 pages.

Hu et al, "ALPS Accurate Landmark Positioning at City Scales", ACM International Joint Conference on Pervasive and Ubiquitous Computing (UbiComp 2016), (Jul. 2016), 12 pages.

Luo et al, "Geotagging in Multimedia and Computer Vision—A Survey", Multimed Tools Appl, (Oct. 19, 2010), 25 pages.

Sagrebin et al., "Real-Time Moving Object Detection for Video Surveillance", 2009 Sixth IEEE International Conference on Advanced Video and Signal Based Surveillance, (Sep. 2-4, 2009), 6 pages.

Zhang et al., "Parallel Connecting Deep Shallow CNNs for Simultaneous Detection of Big and Small Objects", Pattern Recognition and Computer Vision (PRCV 2018), Lecture Notes in Computer Science, (Nov. 2, 2018), 12 pages.

Office Action for U.S. Appl. No. 17/123,485 dated Aug. 2, 2022.

Notice of Allowance for U.S. Appl. No. 17/132,876 dated Aug. 25, 2022.

Nirikin et al, "HyperSeg: Patch-Wise Hypernetwork for Real-Time Semantic Segmentation", 2021 IEEE/CVF Conference on Computer Vision and Pattern Recognition (CVPR), arXiv:2012.11582v2, (Apr. 8, 2021), 15 pages.

Chaudhury et al., Auto-Rectification Of Users Photos, https://static.googleusercontent.com/media/research.google.com/en//pubs/archive/42532.pdf.

U.S. Appl. No. 17/123,935, filed Dec. 16, 2020, In re: Melnik et al. entitled, "Method, Apparatus, And Computer Program Product For Training A Signature Encoding Module And A Query Processing Module To Identify Objects Of Interest Within An Image Utilizing Digital Signatures".

U.S. Appl. No. 17/123,485, filed Dec. 16, 2020, In re: Melnik et al. entitled, "Method, Apparatus, And Computer Program Product For Identifying Objects Of Interest Within An Image Captured By A Relocatable Image Capture Device".

U.S. Appl. No. 17/132,911, filed Dec. 23, 2020, In re: Melnik et al. entitled, "Method, Apparatus, And Computer Program Product For Training A Signature Encoding Module And A Query Processing Module Using Augmented Data".

U.S. Appl. No. 17/132,860, filed Dec. 23, 2020, In re: Melnik et al. entitled, "Method, Apparatus, And Computer Program Product For Change Detection Based On Digital Signatures".

U.S. Appl. No. 17/132,876, filed Dec. 23, 2020, In re: Melnik et al. entitled, "Method, Apparatus, And Computer Program Product For Displaying Virtual Graphical Data Based On Digital Signatures".

Extended European Search Report for European Application No. 22211724.4 dated Apr. 13, 2023, 11 pages.

Notice of Allowance for U.S. Appl. No. 17/132,876 dated Oct. 19, 2022.

Final Office Action for U.S. Appl. No. 17/123,485 dated Dec. 5, 2022.

Office Action for U.S. Appl. No. 17/123,935 dated May 10, 2023.

Non-Final Office Action for U.S. Appl. No. 17/132,911 dated Mar. 6, 2023.

Non-Final Office Action for U.S. Appl. No. 17/132,860 dated Mar. 13, 2023.

Office Action for European Application No. 21214679.9 dated Dec. 12, 2023, 9 pages.

Office Action for European Application No. 21214761.5 dated Dec. 12, 2023, 7 pages.

Final Office Action for U.S. Appl. No. 17/123,485 dated Jan. 22, 2024.

\* cited by examiner

METHOD, APPARATUS, AND COMPUTER PROGRAM PRODUCT FOR IDENTIFYING AN OBJECT OF INTEREST WITHIN AN IMAGE FROM A DIGITAL SIGNATURE GENERATED BY A SIGNATURE ENCODING MODULE INCLUDING A HYPERNETWORK

TECHNOLOGICAL FIELD

An example embodiment relates generally to a method, apparatus, and computer program product for generating and utilizing a digital signature to identify an object of interest with the digital signature being generated by a signature encoding module including a hypernetwork such that the digital signature not only represents the object of interest, but also includes one or more parameters configured to at least partially define processing to be performed by another neural network, such as the neural network of a query processing module that identifies the object of interest from the digital signature.

BACKGROUND

Applications of Augmented Reality (AR) typically involve superimposing a computer-generated image on a user's view of the real world, thus providing a composite view. In some examples, video may be enhanced in real-time by overlaying a camera image with additional data related to what is being shown in the video.

Approaches to such enhancements have revolved around three-dimensional (3D) mapping and 3D positioning. For example, one approach may involve mapping continuous video to 3D point clouds while localizing within the 3D point clouds. However, approaches such as these are difficult to scale since the type and amount of data that is generated imposes significant demands upon the amount of processing power needed to process such data, particularly in real-time.

BRIEF SUMMARY

A method, apparatus and computer program product are therefore provided in accordance with an example embodiment in order to generate and utilize digital signatures to identify objects of interest within images. In this regard, the signature encoding module that generates the digital signature includes a hypernetwork such that the resulting digital signature not only represents the object of interest, but also includes one or more parameters configured to at least partially define processing to be performed by another neural network, such as the neural network of a query processing module that identifies the object of interest from the digital signature. By including a functional component in terms of the one or more parameters, the encoding of the digital signature may be improved, such as to better handle invariances within the image, such as pose, scale, lighting, weather and/or occlusion, and/or to improve compression of the image. In another example embodiment, a method, apparatus and computer program product are provided to train at least one of a signature encoding module and/or a query processing module in order to better identify an object of interest within an image based upon a digital signature generated by the signature encoding module including a hypernetwork. In this example embodiment, the digital signature may include one or more parameters configured to at least partially define processing to be performed by another neural network, such as the neural network of the query processing module, thereby providing for performance improvements in the identification of the object of interest.

In an example embodiment, a method is provided for generating and utilizing a digital signature to identify an object of interest. The method includes providing a reference image depicting the object of interest to a signature encoding module comprising a hypernetwork. An indication of the object of interest within the reference image is also provided. The method also includes generating, with the signature encoding module, the digital signature representing the object of interest. The digital signature generated by the signature encoding module comprising the hypernetwork also includes one or more parameters configured to at least partially define processing to be performed by another neural network. The method further includes providing (i) the digital signature representing the object of interest and the one or more parameters and (ii) at least one query image to a query processing module comprising a neural network. The method additionally includes identifying, by the query processing module, the object of interest within the at least one query image based upon the digital signature of the object of interest. In this regard, the method identifies the object of interest by processing the at least one query image with the neural network of the query processing module with the processing being at least partially defined by the one or more parameters generated by the signature encoding module comprising the hypernetwork.

The one or more parameters generated by the signature encoding module comprising the hypernetwork in accordance with an example embodiment include one or more weights to be utilized by the neural network of the query processing module. In this example embodiment, the neural network of the query processing module includes a plurality of neural network layers, and the processing of the at least one query image with the neural network of the query processing module utilizes the one or more weights in predefined layers of the neural network. In an example embodiment, the one or more parameters generated by the signature encoding module comprising the hypernetwork include one or more parameters configured to at least partially define a number of layers of the neural network of the query processing module that process the at least one query image. Additionally or alternatively, the one or more parameters generated by the signature encoding module comprising the hypernetwork may include one or more parameters configured to specify that the neural network of the query processing module is to perform additional image processing of the at least one query image.

The neural network of the query processing module of an example embodiment also comprises a hypernetwork. In this example embodiment, the processing of the at least one query image includes modifying one or more parameters of the hypernetwork of the query processing module based upon the at least one query image. In this regard, modifying one or more parameters of the hypernetwork of the query processing module may include modifying one or more weights utilized by the neural network of the query processing module based upon the at least one query image. In an example embodiment, generating the digital signature includes generating the digital signature representing the object of interest and at least some context associated with the object of interest in the reference image. The method of an example embodiment also includes augmenting the at least one query image based upon the object of interest identified therein.

In another example embodiment, an apparatus is provided that is configured to generate and utilize a digital signature to identify an object of interest. The apparatus includes a signature encoding module comprising a hypernetwork. The signature encoding module is configured to receive a reference image depicting the object of interest. An indication of the object of interest within the reference image is also received. The signature encoding module is also configured to generate the digital signature representing the object of interest. The digital signature generated by the signature encoding module comprising the hypernetwork also includes one or more parameters configured to at least partially define processing to be performed by another neural network. The apparatus also includes a query processing module comprising a neural network and configured to receive (i) the digital signature representing the object of interest and the one or more parameters and (ii) at least one query image. The query processing module is also configured to identify the object of interest within the at least one query image based upon the digital signature of the object of interest. The query processing module is configured to identify the object of interest by processing the at least one query image with the neural network with the processing being at least partially defined by the one or more parameters generated by the signature encoding module comprising the hypernetwork.

The one or more parameters generated by the signature encoding module comprising the hypernetwork of an example embodiment include one or more weights to be utilized by the neural network of the query processing module. In this example embodiment, the neural network of the query processing module may include a plurality of neural network layers, and the query processing module may be configured to process the at least one query image with the neural network utilizing the one or more weights in predefined layers of the neural network. In an example embodiment, the one or more parameters generated by the signature encoding module comprising the hypernetwork include one or more parameters configured to at least partially define a number of layers of the neural network of the query processing module that process the at least one query image. Additionally or alternatively, the one or more parameters generated by the signature encoding module comprising the hypernetwork in accordance with an example embodiment may include one or more parameters configured to specify that the neural network of the query processing module is to perform additional image processing of the at least one query image.

The neural network of the query processing module of an example embodiment also comprises a hypernetwork, and the query processing module is configured to process the at least one query image by modifying one or more parameters of the hypernetwork of the query processing module based upon the at least one query image. The query processing module of this example embodiment may be configured to modify one or more parameters of the hypernetwork of the query processing module by modifying one or more weights utilized by the neural network of the query processing module based upon the at least one query image. In an example embodiment, the signature encoding module is configured to generate the digital signature by representing the object of interest and at least some context associated with the object of interest in the reference image. The apparatus of an example embodiment also includes processing circuitry configured to augment the at least one query image based upon the object of interest identified therein.

In a further example embodiment, a computer program product is provided that is configured to generate and utilize a digital signature to identify an object of interest. The computer program product includes at least one non-transitory computer-readable storage medium having computer-executable program code instructions stored therein. The computer-executable program code instructions include program code instructions configured to implement a signature encoding module comprising a hypernetwork that receives a reference image depicting the object of interest and an indication of the object of interest within the reference image. The program code instructions that are configured to implement the signature encoding module are also configured to generate the digital signature representing the object of interest. The digital signature also includes one or more parameters configured to at least partially define processing to be performed by another neural network. The program code instructions that are configured to implement the signature encoding module are further configured to provide (i) the digital signature representing the object of interest and the one or more parameters and (ii) at least one query image to program code instructions configured to implement a query processing module comprising a neural network. In this regard, the program code instructions configured to implement the query processing module are also configured to identify the object of interest within the at least one query image based upon the digital signature of the object of interest. In this regard, the program code instructions configured to implement the query processing module are configured to identify the object of interest by processing the at least one query image with the neural network with the processing being at least partially defined by the one or more parameters generated by the program code instructions that are configured to implement the signature encoding module comprising the hypernetwork.

The one or more parameters generated by the program code instructions configured to implement the signature encoding module comprising the hypernetwork in accordance with an example embodiment include one or more weights to be utilized by the neural network of the query processing module. In this example embodiment, the neural network of the query processing module includes a plurality of neural network layers, and the program code instructions configured to process of the at least one query image with the neural network of the query processing module are configured to utilize the one or more weights in predefined layers of the neural network. In an example embodiment, the one or more parameters generated by the program code instructions configured to implement the signature encoding module comprising the hypernetwork include one or more parameters configured to at least partially define a number of layers of the neural network of the query processing module that process the at least one query image. Additionally or alternatively, the one or more parameters generated by the program code instructions configured to implement the signature encoding module comprising the hypernetwork may include one or more parameters configured to specify that the neural network of the query processing module is to perform additional image processing of the at least one query image.

The neural network of the query processing module of an example embodiment also comprises a hypernetwork. In this example embodiment, the program code instructions configured to process the at least one query image include program code instructions configured to modify one or more parameters of the hypernetwork of the query processing module based upon the at least one query image. In this regard, the program code instructions configured to modify one or more parameters of the hypernetwork of the query processing module may include program code instructions configured to modify one or more weights utilized by the neural network of the query processing module based upon the at least one query image. In an example embodiment, the program code instructions configured to generate the digital signature include program code instructions configured to generate the digital signature representing the object of interest and at least some context associated with the object of interest in the reference image. The computer-executable program code instructions of an example embodiment also include program code instructions configured to augment the at least one query image based upon the object of interest identified therein.

In yet another example embodiment, an apparatus is provided that is configured to generate and utilize a digital signature to identify an object of interest. The apparatus includes a signature encoding means comprising a hypernetwork for receiving a reference image depicting the object of interest. An indication of the object of interest within the reference image is also received. The signature encoding means also includes means for generating the digital signature representing the object of interest. The digital signature generated by the signature encoding module comprising the hypernetwork also includes one or more parameters configured to at least partially define processing to be performed by another neural network. The apparatus also includes query processing means comprising a neural network for receiving (i) the digital signature representing the object of interest and the one or more parameters and (ii) at least one query image. The query processing means also includes means for identifying the object of interest within the at least one query image based upon the digital signature of the object of interest. The query processing means identifies the object of interest by processing the at least one query image with the neural network with the processing being at least partially defined by the one or more parameters generated by the signature encoding module comprising the hypernetwork.

The one or more parameters generated by the signature encoding means comprising the hypernetwork of an example embodiment include one or more weights to be utilized by the neural network of the query processing means. In this example embodiment, the neural network of the query processing means may include a plurality of neural network layers, and the query processing means may be configured to process the at least one query image with the neural network utilizing the one or more weights in predefined layers of the neural network. In an example embodiment, the one or more parameters generated by the signature encoding means comprising the hypernetwork include one or more parameters configured to at least partially define a number of layers of the neural network of the query processing means that process the at least one query image. Additionally or alternatively, the one or more parameters generated by the signature encoding means comprising the hypernetwork in accordance with an example embodiment may include one or more parameters configured to specify that the neural network of the query processing means is to perform additional image processing of the at least one query image.

The neural network of the query processing means of an example embodiment also comprises a hypernetwork, and the means of the query processing means for processing the at least one query image includes means for modifying one or more parameters of the hypernetwork of the query processing means based upon the at least one query image. The means of the query processing means of this example embodiment for modifying one or more parameters of the hypernetwork includes means for modifying one or more weights utilized by the neural network of the query processing means based upon the at least one query image. In an example embodiment, the means for the signature encoding means for generating the digital signature includes means for representing the object of interest and at least some context associated with the object of interest in the reference image. The apparatus of an example embodiment also includes means for augmenting the at least one query image based upon the object of interest identified therein.

In an example embodiment, a method is provided for training at least one of a signature encoding module and a query processing module. The training includes providing the signature encoding module comprising a hypernetwork with a reference image depicting an object of interest and having the object of interest marked within the reference image. The training also includes generating a digital signature of the object of interest. The digital signature generated by the signature encoding module comprising the hypernetwork also includes one or more parameters configured to at least partially define processing to be performed by another neural network, such as one or more weights to be utilized by the another neural network, e.g., the neural network of the query processing module. The method also includes providing the query processing module comprising a neural network with (i) the digital signature representing the object of interest and the one or more parameters and (ii) at least one query image. The method further includes identifying the object of interest within the query image based upon the digital signature of the object of interest. In this regard, identifying the object of interest includes processing the at least one query image with the neural network of the query processing module with the processing being at least partially defined by the one or more parameters generated by the signature encoding module comprising the hypernetwork. In addition, the method includes modifying at least one of the signature encoding module or the query processing module based upon a qualitative or quantitative difference between the object of interest identified within the query image and the object of interest marked in the reference image.

In another example embodiment, an apparatus is provided for training at least one of a signature encoding module and a query processing module. The apparatus includes at least one processor and at least one memory including computer program code with the at least one memory and the computer program code configured to, with the at least one processor, cause the apparatus to provide the signature encoding module comprising a hypernetwork with a reference image depicting an object of interest and having the object of interest marked within the reference image such that the signature encoding module generates a digital signature of the object of interest. The digital signature generated by the signature encoding module comprising the hypernetwork also includes one or more parameters configured to at least partially define processing to be performed by another neural network, such as one or more weights to be utilized by the another neural network, e.g., the neural network of the query processing module. With respect to the training, the at least one memory and the computer program code are also configured to, with the at least one processor, cause the apparatus to provide the query processing module comprising a neural network with (i) the digital signature representing the object of interest and the one or more parameters and (ii) at least one query image. The at least one memory and the computer program code are further configured to, with the at least one processor, cause the apparatus to identify the object of interest within the query image based upon the digital signature of the object of interest. In this regard, the at least one memory and the computer program code are configured to, with the at least one processor, cause the apparatus to identify the object of interest by processing the at least one query image with the neural network of the query processing module with the processing being at least partially defined by the one or more parameters generated by the signature encoding module comprising the hypernetwork. In addition, the at least one memory and the computer program code are configured to, with the at least one processor, cause the apparatus to modify at least one of the signature encoding module or the query processing module based upon a qualitative or quantitative difference between the object of interest identified within the query image and the object of interest marked in the reference image.

In a further example embodiment, a computer program product is provided that is configured to train at least one of a signature encoding module and a query processing module. The computer program product includes at least one non-transitory computer-readable storage medium having computer-executable program code instructions stored therein. The computer-executable program code instructions include program code instructions configured to provide the signature encoding module comprising a hypernetwork with a reference image depicting an object of interest and having the object of interest marked within the reference image such that the signature encoding module generates a digital signature of the object of interest. The digital signature generated by the signature encoding module comprising the hypernetwork also includes one or more parameters configured to at least partially define processing to be performed by another neural network, such as one or more weights to be utilized by the another neural network, e.g., the neural network of the query processing module. The computer-executable program code instructions also include program code instructions configured to provide the query processing module comprising a neural network with (i) the digital signature representing the object of interest and the one or more parameters and (ii) at least one query image. The computer-executable program code instructions further include program code instructions configured to identify the object of interest within the query image based upon the digital signature of the object of interest. In this regard, the program code instructions configured to identify the object of interest include program code instructions configured to process the at least one query image with the neural network of the query processing module with the processing being at least partially defined by the one or more parameters generated by the signature encoding module comprising the hypernetwork. In addition, the computer-executable program code instructions include program code instructions configured to modify at least one of the signature encoding module or the query processing module based upon a qualitative or quantitative difference between the object of interest identified within the query image and the object of interest marked in the reference image.

In yet another example embodiment, an apparatus is provided that includes means for training at least one of a signature encoding module and a query processing module. The means for training includes means for providing the signature encoding module comprising a hypernetwork with a reference image depicting an object of interest and having the object of interest marked within the reference image. The means for training also includes means for generating a digital signature of the object of interest. The digital signature generated by the signature encoding module comprising the hypernetwork also includes one or more parameters configured to at least partially define processing to be performed by another neural network, such as one or more weights to be utilized by the another neural network, e.g., the neural network of the query processing module. The apparatus also includes means for providing the query processing module comprising a neural network with (i) the digital signature representing the object of interest and the one or more parameters and (ii) at least one query image. The apparatus further includes means for identifying the object of interest within the query image based upon the digital signature of the object of interest. In this regard, the means for identifying the object of interest includes means for processing the at least one query image with the neural network of the query processing module with the processing being at least partially defined by the one or more parameters generated by the signature encoding module comprising the hypernetwork. In addition, the apparatus includes means for modifying at least one of the signature encoding module or the query processing module based upon a qualitative or quantitative difference between the object of interest identified within the query image and the object of interest marked in the reference image.

BRIEF DESCRIPTION OF THE DRAWINGS

Having thus described certain embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment in order to identify an object of interest within an image, such as an image that has been captured by an image capture device. The object of interest may be identified based upon respective digital signatures of one or more objects of interest that are depicted by one or more reference images and, in some embodiments, based upon at least some context associated with the one or more objects of interest from the reference image(s). In some embodiments, the object of interest within the image is identified by a query processing module comprising a neural network that has been trained as described below to recognize the object of interest utilizing the respective digital signature of one or more objects of interest that are depicted by one or more reference images and, in some embodiments, based upon at least some context associated with the one or more objects of interest from the one or more reference images. In this regard, the method, apparatus, and computer program product may be configured to utilize a trained query processing module to identify objects of interest within an image.

The digital signatures of one or more objects of interest that are depicted by one or more reference images may be generated by a signature encoding module comprising a hypernetwork. As a result, the digital signature not only represents the object of interest, but also includes one or more parameters configured to at least partially define the processing to be performed by another neural network, such as the neural network of the query processing module that identifies the object of interest from the digital signature. By including a functional component in terms of the one or more parameters, the encoding of the digital signature may be improved, such as to better handle invariances within the image, such as pose, scale, lighting, weather and/or occlusion, and/or to improve compression of the image.

The apparatus that is configured to identify an object of interest within an image based upon respective digital signatures of one or more objects of interest and, in some embodiments, at least some context associated with the one or more objects of interest that are depicted by the one or more reference images may be any of a wide variety of computing devices. For example, the apparatus may be embodied by a server, a computer workstation, a distributed network of computing devices, a personal computer, a navigation or mapping system, or any other type of computing device.

Figure 1:
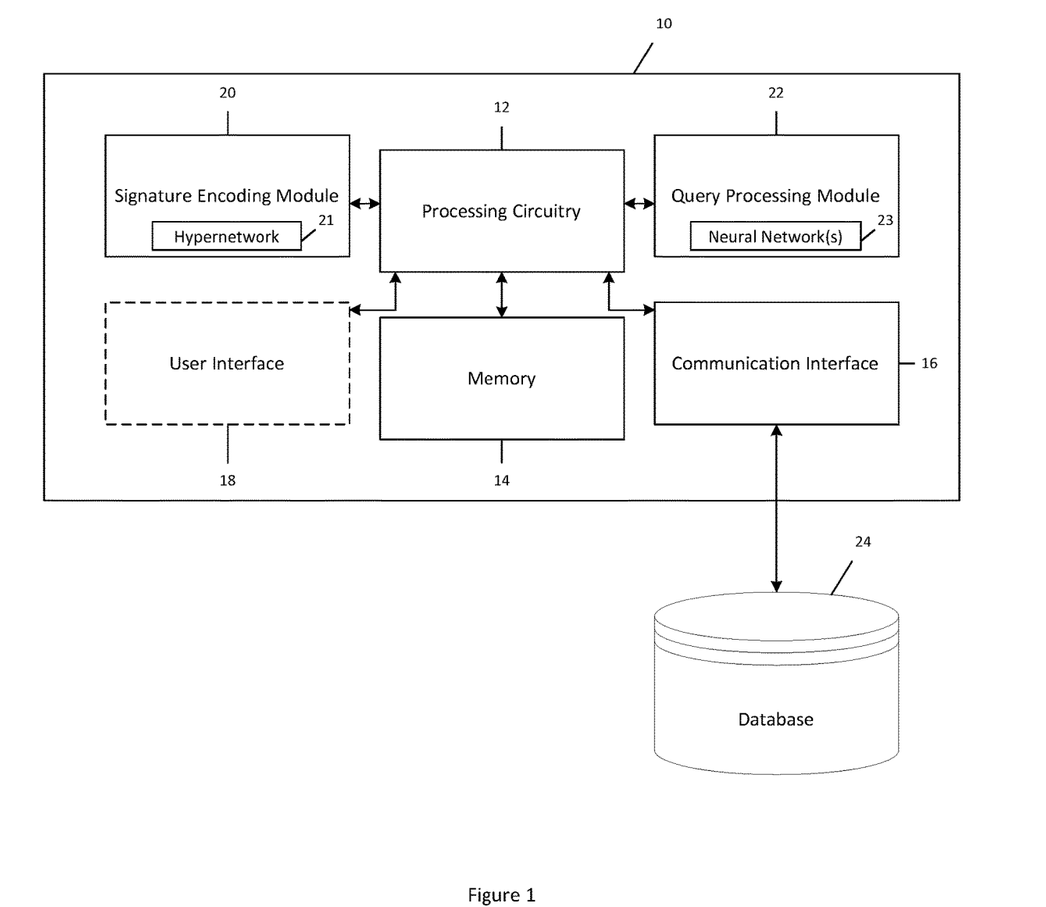
FIG. 1 is a block diagram of an apparatus that may be specifically configured in accordance with an example embodiment.

Regardless of the manner in which the apparatus is embodied, however, the apparatus 10 includes, is associated with, or is in communication with processing circuitry 12, memory 14, a communication interface 16, a query processing module 22, a signature encoding module 20 and optionally a user interface 18, as shown in FIG. 1. In some embodiments, the processing circuitry 12 (and/or co-processors or any other processors assisting or otherwise associated with the processing circuitry) can be in communication with the memory 14 via a bus for passing information among components of the apparatus. Although shown as separate components in FIG. 1, the processing circuitry of some embodiments may include one or both of the query processing module and the signature encoding module.

The memory 14 can be non-transitory and can include, for example, one or more volatile and/or non-volatile memories. In other words, for example, the memory 14 may be an electronic storage device (for example, a computer readable storage medium) comprising gates configured to store data (for example, bits) that can be retrievable by a machine (for example, a computing device like the processing circuitry). The memory can be configured to store information, data, content, applications, instructions, or the like for enabling the apparatus to carry out various functions in accordance with an example embodiment of the present disclosure. For example, the memory 14 can be configured to buffer input data for processing by the processing circuitry 12. Additionally or alternatively, the memory can be configured to store instructions for execution by the processing circuitry.

The processing circuitry 12 can be embodied in a number of different ways. For example, the processing circuitry 12 may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry 12 can include one or more processing cores configured to perform independently. A multi-core processor can enable multiprocessing within a single physical package. Additionally or alternatively, the processing circuitry 12 can include one or more processors configured in tandem via the bus to enable independent execution of instructions, pipelining and/or multithreading.

In an example embodiment, the processing circuitry 12 can be configured to execute instructions stored in the memory 14 or otherwise accessible to the processing circuitry. Alternatively or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device (for example, a computing device) configured to employ an embodiment of the present disclosure by further configuration of the processor by instructions for performing the algorithms and/or operations described herein. The processing circuitry 12 can include, among other things, a clock, an arithmetic logic unit (ALU) and/or one or more logic gates configured to support operation of the processing circuitry.

The apparatus 10 of an example embodiment can also include the communication interface 16 that can be any means such as a device or circuitry embodied in either hardware or a combination of hardware and software that is configured to receive and/or transmit data from/to other electronic devices in communication with the apparatus, such as a database 24 which, in one embodiment, comprises a map database that stores data (e.g., map data, route data, etc.) generated and/or employed by the processing circuitry 12. Additionally or alternatively, the communication interface can be configured to communicate in accordance with various wireless protocols including Global System for Mobile Communications (GSM), such as but not limited to Long Term Evolution (LTE). In this regard, the communication interface can include, for example, an antenna (or multiple antennas) and supporting hardware and/or software for enabling communications with a wireless communication network. In this regard, the communication interface can include, for example, an antenna (or multiple antennas) and supporting hardware and/or software for enabling communications with a wireless communication network. Additionally or alternatively, the communication interface can include the circuitry for interacting with the antenna(s) to cause transmission of signals via the antenna(s) or to handle receipt of signals received via the antenna(s). In some environments, the communication interface can alternatively or also support wired communication and/or may alternatively support vehicle to infrastructure wireless links.

The apparatus 10 may also comprise a signature encoding module 20. The signature encoding module may be configured to perform operations associated with generating a digital signature of an object of interest, such as during a training process. In some embodiments, the digital signature also represents context associated with the object of interest. As described below, during training, the signature encoding module 20 may receive, as input, a reference image that includes an object of interest that has been demarcated and be trained to provide, as output, a digital signature representing the object of interest and, in some embodiments, at least some of the context associated with the object of interest.

As shown in FIG. 1 and as described below, the signature encoding module 20 includes a hypernetwork 21. A hypernetwork is configured to generate one or more parameters that at least partially define the performance of another network. For example, a hypernetwork may be configured to generate weights to be utilized by another network, such as a neural network. The digital signature generated by the signature encoding module may not only represent the object of interest (and, in some embodiments, context associated with the object of interest), but may also include the one or more parameters that serve to at least partially define another network.

In addition to the hypernetwork, the signature encoding module 20 of some embodiments may comprise a deep learning model, such as a Convolutional Neural Network (CNN) and, more particularly, a Residual Neural Network (a ResNet). In this regard, the signature encoding module may comprise a layered or recurrent structure, such as a pyramidal structure, of neural network layers configured to extract features from reference images provided to the signature encoding module such that a digital signature may be derived.

The apparatus 10 may also comprise a query processing module 22. The query processing module 22 may be configured to perform operations associated with identifying an object of interest within an image based upon respective digital signatures of one or more objects of interest that are depicted by one or more reference images. The query processing module 22 may be trained to identify objects of interest within images. As described in more detail below, during training, the query processing module may receive, as input, one or more query images in addition to a digital signature of a respective object of interest, such as a digital signature generated by the signature encoding module 20 and stored by the memory 14 and/or a database 24. Based thereupon, the query processing module may be trained to predict a location in the one or more query images that depicts the object of interest. Once trained, the query processing module may be configured to efficiently identify an object of interest within an image based upon respective digital signatures of one or more objects of interest that are depicted by one or more reference images.

In some embodiments, the query processing module 22 may also comprise a deep learning model, such as a CNN, e.g., a ResNet. The query processing module of an example embodiment may also comprise a layered or recurrent structure, such as a pyramidal structure, of neural network layers configured to extract features from one or more query images and to utilize the digital signature to identify the corresponding object of interest within the one or more query images. In some embodiments, the query processing module may include one or more aggregating layers configured to combine a digital signature generated by the signature encoding module 20 with a query image decomposition. As noted above, the query processing module of an example embodiment includes a neural network 23 and the performance of the query processing module may be enhanced by at least partially defining the query processing module and, more particularly, the neural network in accordance with one or more parameters that have been generated by the hypernetwork 21 of the signature encoding module 20 and are included in the digital signature. For example, the weights to be applied by the neural network 23 may be defined by the one or more parameters that have been generated by the hypernetwork 21 of the signature encoding module 20 and are included in the digital signature.

Although depicted in FIG. 1 to be distinct from the processing circuitry 12, the signature encoding module 20 and/or the query processing module 22 may be embodied by the processing circuitry in other example embodiments.

In some embodiments, the database 24 may be configured to store representations of a plurality of images and associated metadata. In some embodiments, the representations of the plurality of images may be the embeddings, such as hashable embeddings, generated for the respective images, although different or additional representations of the images may be stored in the database in other embodiments including storage of the images themselves. The metadata for the plurality of images may comprise location data (e.g., GPS coordinates) that defines the location at which the image was taken. The metadata for the plurality of images may also comprise camera-related information, such as a camera orientation at the time that the image was captured and/or other camera-related information.

The database 24 may also store one or more digital signatures associated with respective images. The digital signatures are representative of an object of interest within a respective image, as well as one or more parameters that are configured to at least partially define processing to be performed by another neural network, such as the neural network 23 of the query processing module 22. In some embodiments, the digital signatures also include at least some of the context associated with the object of interest within the image. One or more digital signatures may be associated with each image. In an embodiment in which multiple digital signatures are associated with a respective image, each digital signature may be representative of a different object of interest and at least some context associated therewith within the object of interest. The digital signatures may have been generated by the signature encoding module 20, as described in more detail below.

The apparatus 10 may also optionally include a user interface 18 that may, in turn, be in communication with the processing circuitry 12 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processing circuitry may comprise user interface circuitry configured to control at least some functions of one or more user interface elements such as a display and, in some embodiments, a plurality of speakers, a ringer, one or more microphones and/or the like. The processing circuitry and/or user interface circuitry embodied by the processing circuitry may be configured to control one or more functions of one or more user interface elements through computer program instructions (for example, software and/or firmware) stored on a memory accessible to the processing circuitry (for example, memory 14, and/or the like).

The signature encoding module 20 may be configured to, using a reference image having an area of the image demarcated (e.g., by masking the reference image) to signify an object of interest (e.g., place of interest, or the like), generate one or more digital signatures (e.g., sequences of bytes) that represent the object of interest, such as in the context of the reference image. Since the signature encoding module includes a hypernetwork 21, the resulting digital signature(s) also include one or more parameters, e.g., weights, that at least partially define processing to be performed by another neural network, such as a neural network 23 of a query processing module 22. In this regard, the query processing module may be configured to, using one or more digital signatures generated by the signature encoding module and one or more query images, identify the object of interest within the one or more query images based upon the digital signature of the same object of interest. The performance of the query processing module may be enhanced by at least partially defining the neural network of the query processing module in accordance with the one or more parameters from the digital signature generated by the signature encoding module. By including a functional component in terms of the one or more parameters, the encoding of the digital signature may be improved, such as to better handle invariances within the image, such as pose, scale, lighting, weather and/or occlusion, and/or to improve compression of the image.

Figure 2:
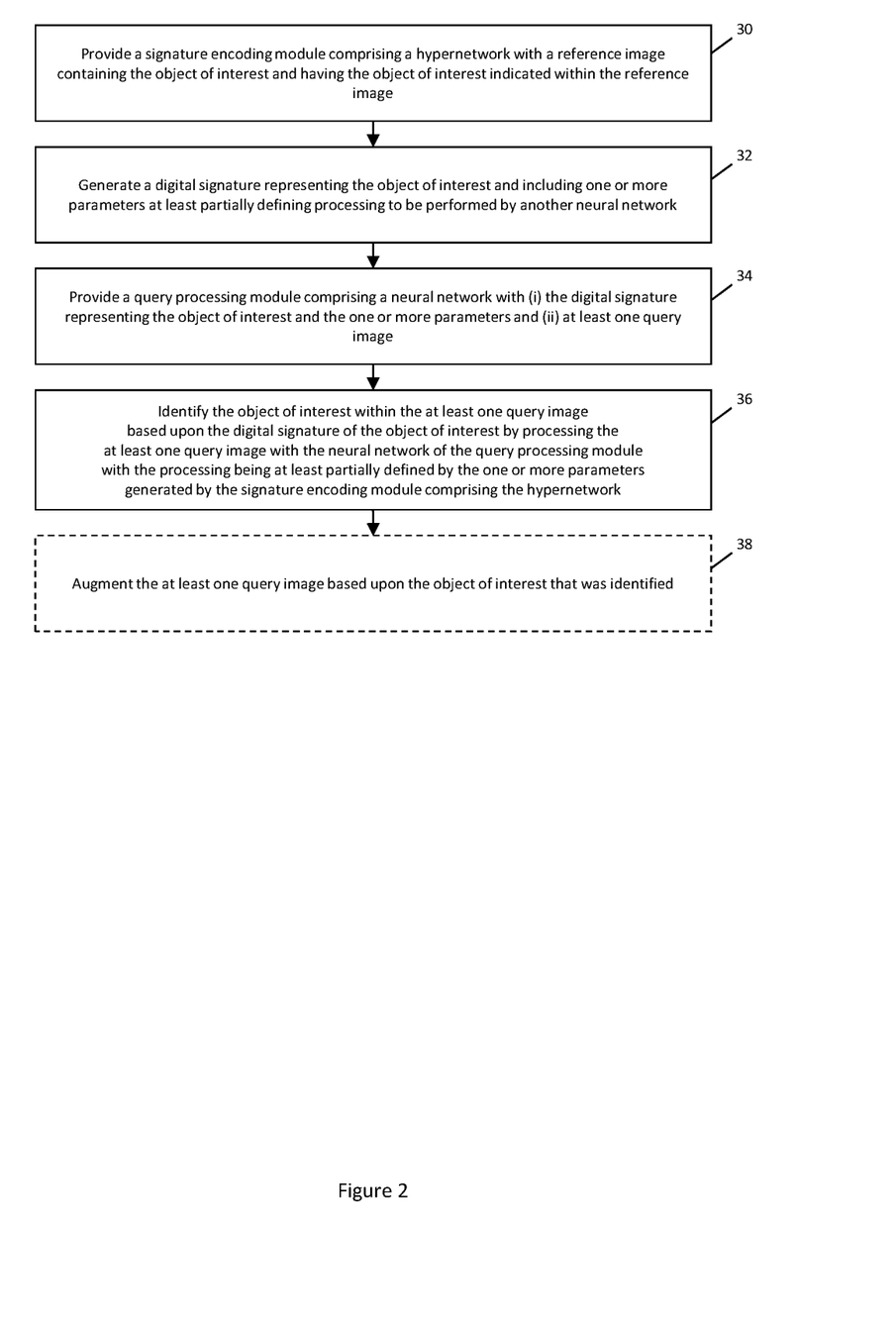
FIG. 2 is a flowchart illustrating the operations performed, such as by the apparatus of FIG. 1, in order to generate and utilize a digital signature to identify an object of interest in accordance with an example embodiment.

Referring now to FIG. 2, the operations performed, such as by the apparatus 10 of FIG. 1, in order to generate and utilize a digital signature to identify an object of interest within an image are depicted. As shown in block 30, the apparatus includes means, such as the processing circuitry 12, memory 14, the signature encoding module 20, and/or the like, for providing the signature encoding module with a reference image depicting an object of interest. The object of interest is marked within the reference image that is provided to the signature encoding module. Although described herein as the provision of a reference image, a plurality of reference images and, in an example embodiment, a video comprised of a plurality of frames may be provided to the signature encoding module, each of which is processed as described herein. As such, reference herein to the provision of a reference image also comprises the provision of a plurality of reference images in other example embodiments.

The signature encoding module 20 is therefore configured to receive a reference image. The reference image may be received from a source external to and in communication with the apparatus (e.g., by way of communication interface 16), the database 24, from memory 14, and/or other sources.

In some embodiments, the reference image depicts an object of interest. For example, the reference image may be an image generated by a camera (e.g., a photograph or a frame from a video) such that the image depicts real-world content (e.g., buildings, roads, signs, landmarks, and/or other objects). In this regard, the object of interest may be content that is desired to be located in one or more other images (e.g., query images discussed further below). The object of interest is stationary in at least some example embodiments.

The reference image may be modified such that the object of interest within the reference image is indicated, such as by being demarcated. The object of interest may be demarcated in the reference image in various manners. For example, in some embodiments, in addition to a reference image, an image mask that demarcates the object of interest in the reference image may also be provided to the signature encoding module. For example, an image mask may take the form of a matrix having elements that correspond to one or more pixels of the reference image. In this example embodiment, the matrix may be configured to designate certain pixels of the reference image that include the object of interest. In other embodiments, the object of interest may be demarcated within the reference image itself. Demarcation of the object of interest may occur prior to the signature encoding module 20 receiving the reference image.

Once the reference image and indication of the object of interest within the reference image are provided to the signature encoding module 20, the signature encoding module may generate a digital signature for the object of interest and, in some embodiments, for at least some context associated with the object of interest. In this regard and as shown in block 32, the apparatus includes means, such as the processing circuitry 12, memory 14, the signature encoding module 20, and/or the like, for generating a digital signature of the object of interest in the reference image. In some embodiments, the digital signature that is generated is also representative of at least some context associated with the object of interest in reference image.

As described herein, "context" may refer to a portion of an image that is near to, such as by being adjacent to, proximate or surrounding, the object of interest. The context may include the environment or other surroundings located about the object of interest. In other words, the context associated with an object of interest is context that is visible when viewing the object of interest and, for at least some objects of interest, is external to the object of interest. For example, in an instance in which the object of interest in a reference image is a particular building, the context may comprise one or more buildings or other objects that are in close proximity to the particular building, such as adjacent buildings as well as other features, e.g., statues, street signs, open spaces, etc., in the vicinity of the building. In an embodiment in which the object of interest is demarcated, such as with an image mask, the context is generally represented by a portion of the reference image that is outside of, but adjacent or otherwise proximate or near to the image mask. Embodiments herein describe an object of interest that is stationary (e.g., a building), as well as context surrounding the object of interest being also stationary (e.g., neighboring buildings, locations, or the like). Since the object of interest is stationary, the stationary context surrounding the object of interest may be considered in conjunction with the identification of the object of interest in contrast to the identification or recognition of mobile or deformable objects of interest, which cannot rely upon the context in the vicinity thereof since the context may change based upon the mobility or deformability of these other object of interest. The context is typically implicit and need not be specifically designated as such.

By taking into account the context associated with an object of interest in the generation of the digital signature, a particular object of interest may be identified within a query image even if there are other similar objects present. For example, in an example embodiment in which the object of interest is a particular franchised restaurant located at a specific location, the generation of a digital signature of the particular restaurant that takes into account the context associated the specific location such that the particular restaurant can be distinguished from other restaurants of the same franchise that are at different locations. Although the different restaurants may all have the same appearance, the context associated with the restaurants is different from one restaurant to another, thereby allowing the digital signature to distinguish the restaurants. By taking the context associated with an object of interest into account in the generation of the digital signature, the query processing module is capable of identifying a particular object of interest within a query image even if occlusions or distortions in the query image prevent the particular object of interest from being fully visible in the query image.

In some embodiments, the signature encoding module 20 may comprise a plurality of neural network layers configured to decompose the reference image and a representation therein of the object of interest and, in some embodiments, at least some of the context associated with the object of interest to extract features therefrom and to derive a digital signature representing the object of interest and, in some embodiments, at least some of the context associated with the object of interest. For example, in some embodiments, the digital signature may be derived based on the object of interest and at least some context associated with the object of interest, such as one or more objects in the reference image other than the object of interest.

In some embodiments, the apparatus, such as the signature encoding module 20, is configured to generate the digital signature by analyzing the reference image at different (e.g., higher) resolutions and extracting additional features from the reference image as the reference image is advanced from a courser resolution processed by one neural network layer to a finer resolution processed by another, subsequent neural network layer. \

As noted above, the signature encoding module 20 includes a hypernetwork 21. As a result, the signature encoding module is configured to generate a digital signature that also includes one or more parameters configured to at least partially define processing to be performed by another neural network, such as the neural network 23 of the query processing module 22. The signature encoding module including the hypernetwork may be configured to generate a digital signature having a variety of different types of parameters that at least partially define the processing to be performed by another neural network.

In an example embodiment, the one or more parameters generated by the signature encoding module 20 comprising the hypernetwork 21 and included in the digital signature include one or more weights to be utilized by the neural network 23 of the query processing module 22. In addition to the weight(s) or instead of the weight(s), the one or more parameters generated by the signature encoding module comprising the hypernetwork and included in the digital signature may include one or more parameters configured to modify the network architecture of the query processing module and, in particular, the neural network(s) of the query processing module. The one or more parameters may be configured to modify the network architecture in various manners, such as by at least partially defining the number of layers of the neural network of the query processing module that processes the at least one query image. Additionally or alternatively, the one or more parameters may be configured to modify the network architecture by specifying that the neural network(s) of the query processing module is to perform additional image processing of the at least one query image. For example, the one or more parameters may instruct the query processing module to process the image to take into account the intrinsic parameters of the camera that captured the query image and/or the weather, the lighting and/or the angle of the camera at the time of image capture.

Figure 3:
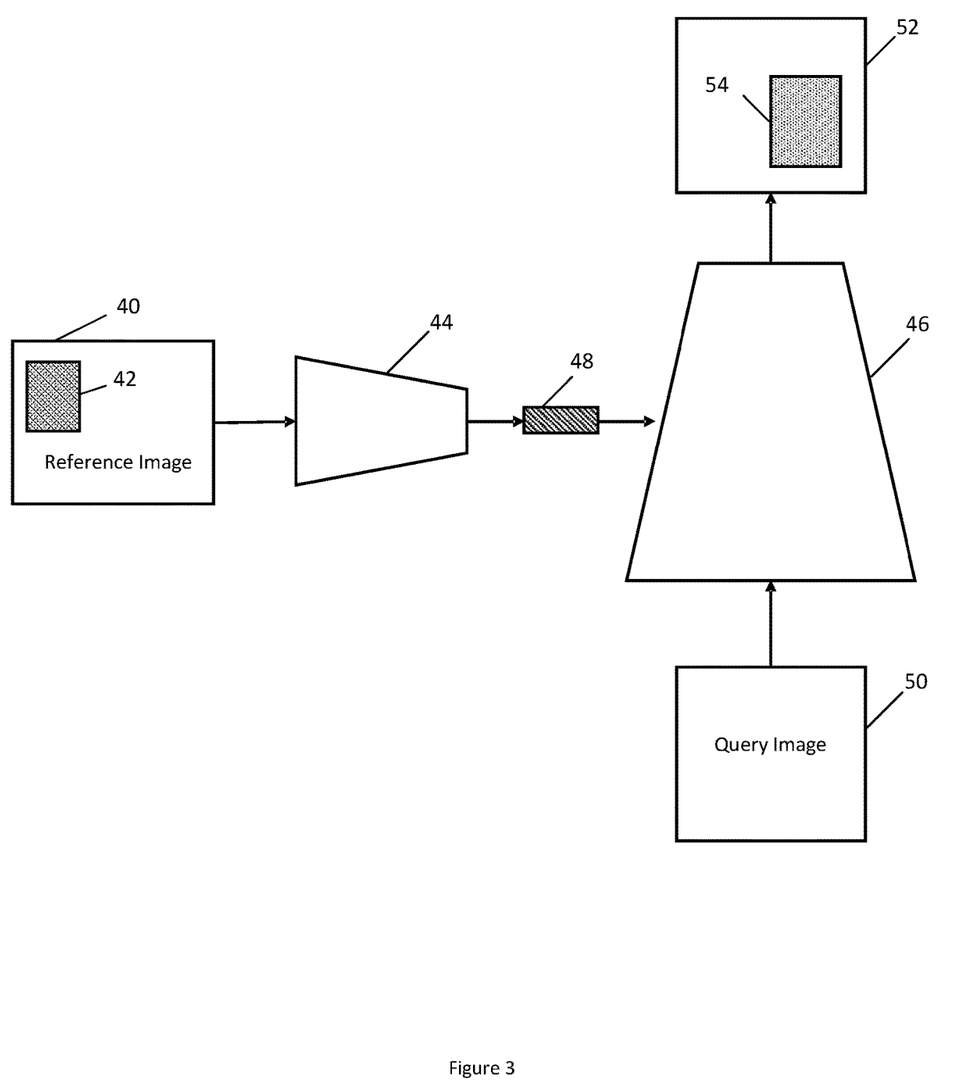
FIG. 3 is a graphical representation of operations performed, such as by the apparatus of FIG. 1, utilizing a signature encoding module and query processing module in accordance with an example embodiment.

To illustrate, FIG. 3 depicts a graphical representation of an apparatus 10 having a signature encoding module 44 that is provided with a reference image 40 having a demarcated object of interest 42. The signature encoding module 44 of this example embodiment comprises a plurality of neural network layers in a multi-scale, e.g., layered or recurrent, structure configured to decompose the reference image and a representation therein of the object of interest to extract features therefrom. As a result, the signature encoding module is configured to derive a digital signature 48 representing the object of interest that was demarcated in the reference image and, in some embodiments, at least some of the context associated with the object of interest. The signature encoding module of this example embodiment also includes a hypernetwork such that the digital signature that is generated also include one or more parameters configured to at least partially define processing to be performed by another neural network, such as the neural network of the query processing module. In some embodiments, the digital signature may comprise a sequence of bits and bytes unique to the object of interest and the one or more parameters and, in some embodiments, the associated context.

In some embodiments, once a digital signature has been generated, the digital signature may be stored, such that the digital signature may be retrieved and used independent of the reference image in order to identify the corresponding object of interest in other images. In this regard, the apparatus 10 includes means, such as the processing circuitry 12, memory 14, the database 24 and/or the like, for storing the digital signature. For example, the digital signature may be stored in memory 14, database 24, and/or another repository or storage source.

Once the digital signature is generated (and optionally stored) as described above, the digital signature may be provided to the query processing module 22. In addition to the digital signature, one or more query images may be provided to the query processing module such that the query processing module, once properly trained, can identify the object of interest that is represented by the digital signature within the one or more query images. In this regard, at block 34, the apparatus 10 includes means, such as the processing circuitry 12, memory 14, the signature encoding module 20, and/or the like, for providing the query processing module with a query image and the digital signature representing the object of interest and one or more parameters configured to at least partially define processing to be performed by another neural network, such as the neural network(s) 23 of the query processing module. As noted above, the digital signature of some embodiments also represents at least some of the context associated with the object of interest.

For example, in some embodiments, a query image may comprise an image similar to a reference image (e.g., a photograph or video of real-world content), but may be a photograph or video taken from a different vantage point from the location at which the reference image was taken. In this regard, the query image may depict the same object of interest (and associated context) as the reference image, albeit from a different angle or viewpoint. In some embodiments, during training of the query processing module 22, a query image that does not depict the object of interest may be provided to the query processing module, along with one or more query images that do include the object of interest, in order to more effectively train the query processing module to identify the object of interest only in those query images that actually include the object of interest.

Query images may be provided to the query processing module 22 in a number of ways. For example, the query processing module may be configured to receive the query images, such as from a source external to and in communication with the apparatus 10 (e.g., by way of communication interface 16), the database 24, from memory 14, and/or other sources.

As illustrated for example in FIG. 3, a digital signature 48, such as a digital signature generated by the signature encoding module 44, is provided to a query processing module 46. The digital signature may be provided directly by the signature encoding module, or by a database or other data repository that has stored the digital signature. Additionally, at least one query image 50 is provided to the query processing module 46, as described above. In some embodiments, the query processing module may combine the received digital signature representing the object of interest with a decomposition of the query image using one or more aggregating layers of the plurality of neural network layers of the query processing module 46. At block 36, the apparatus 10 includes means, such as the processing circuitry 12, memory 14, the query processing module 22, and/or the like, for identifying the object of interest within the query image based upon the digital signature of the object of interest and, in some embodiments, at least some of the context associated with the object of interest.

By taking into account the context associated with an object of interest in the generation of the digital signature in accordance with some example embodiments, a particular object of interest may be identified within a query image even if there are other similar objects present. For example, in an example embodiment in which the object of interest is a particular franchised restaurant located at a specific location, the generation of a digital signature of the particular restaurant that takes into account the context associated the specific location such that the particular restaurant can be distinguished from other restaurants of the same franchise that are at different locations. Although the different restaurants may all have the same appearance, the context associated with the restaurants is different from one restaurant to another, thereby allowing the digital signature to distinguish the restaurants. By taking the context associated with an object of interest into account in the generation of the digital signature, the query processing module 22 is capable of identifying a particular object of interest within a query image even if occlusions or distortions in the query image prevent the particular object of interest from being fully visible in the query image.

The digital signature that is generated by the signature encoding module 20 including the hypernetwork 21 includes one or more parameters configured to at least partially define processing to be performed by the neural network(s) 23 of the query processing module 22. Thus, the apparatus 10 includes means, such as the processing circuitry 12, memory 14, the query processing module 22, and/or the like, for identifying the object of interest within the query image by processing the at least one query image with the neural network of the query processing module with the processing being at least partially defined by the one or more parameters generated by the signature encoding module 20 comprising the hypernetwork 21. The manner in which the processing of the query image is performed by the query encoding module is modified in a manner dependent upon the type of parameter that is included within the digital signature since different types of parameters differently define the processing to be performed by the neural network of the query processing module.

In an example embodiment in which the one or more parameters generated by the signature encoding module 20 comprising the hypernetwork 21 and included in the digital signature include one or more weights, the neural network 23 of the query processing module 22 may be at least partially defined utilizing the one or more weights so as to process the query image in accordance with the one or more weights. For example, the neural network of the query processing module may include a plurality of neural network layers with the one or more weights being utilized in predefined layers of the neural network, such as to weight the output of the predefined layers. In addition to the weight(s) or instead of the weight(s), the one or more parameters generated by the signature encoding module comprising the hypernetwork and included in the digital signature may include one or more parameters configured to modify the network architecture of the query processing module and, in particular, the neural network(s) of the query processing module. The one or more parameters may be configured to modify the network architecture in various manners, such as by at least partially defining a number of layers of the neural network of the query processing module that processes the at least one query image. As such, the neural network of the query processing module may be constructed or modified to have the number of layers defined by the digital signature. Additionally or alternatively, the one or more parameters may be configured to modify the network architecture by specifying that the neural network of the query processing module is to perform additional image processing of the at least one query image. As such, the neural network of the query processing module may be configured or modified to perform the additional image processing identified by the one or more parameters from the digital signature. By including a functional component in terms of the one or more parameters in the digital signature, the encoding of the digital signature may be improved, such as to better handle invariances within the image, such as pose, scale, lighting, weather and/or occlusion, and/or to improve compression of the image.

In some embodiments, the query processing module 22, such as the neural network(s) 23 of the query processing module, also includes a hypernetwork. In these embodiments, the query processing module is configured to not only identify the object of interest within the at least one query image by processing the at least one query image with the neural network 23 of the query processing module in a manner that is at least partially defined by the one or more parameters generated by the signature encoding module 20 comprising the hypernetwork 21, but the hypernetwork of the query processing module is configured to additionally alter the weights or other parameters of the neural network, including, in some embodiments, the architecture of the neural network, based on the query image, such as based on the analysis or other processing of the query image performed by the hypernetwork of the query processing module. As a result, the embodiments of the query processing module that include a hypernetwork allow for further improved configurability of the neural network of the query processing module and improved identification of the object of interest within the query image.

In some embodiments, the apparatus 10, such as the processing circuitry 12, may be configured to concurrently process a plurality of images so as to identify a respective object of interest. The use of multiple images can be useful to increase the accuracy with which the object of interest is identified. For example, for a short video clip, the apparatus, such as the processing circuitry, may be configured to process a number of frames of the video clip to improve the performance in regards to identification of an object of interest within any individual frame as information regarding the manner in which one frame is processed may facilitate the processing of other frames and the identification of the same object of interest therein.

In some embodiments, the apparatus optionally includes means, such as the processing circuitry 12, memory 14, the query processing module 22, and/or the like, for augmenting the at least one query image based upon the object of interest identified therein. The query image may be augmented in various manners to identify the object of interest. See block 38 of FIG. 2. For example, as shown in FIG. 3, an augmented image 52 may be provided as an output of the query processing module 46. In this regard, the query image may be augmented by overlaying a representation 54 of the object of interest that has been identified based upon the digital signature upon the query image, thereby producing an augmented image. For example, in some embodiments, the augmented image may comprise an image mask demarking the object of interest within the query image.

In addition to utilizing a query processing module 22 that has been trained to identify an object of interest form a query image such that the query image may be augmented to create an augmented image, a method, apparatus 10 and computer program product are provided in accordance with another example embodiment to train a signature encoding module 20 and/or a query processing module to identify objects of interest within one or more images. The method, apparatus and computer program product of an example embodiment are configured to train a signature encoding module to generate a digital signature representative of an object of interest and, in some embodiments, at least some of the context associated with the object of interest within an image and to correspondingly train a query processing module to utilize the digital signature to identify the object of interest within another image. In this regard, portable compact signatures may be generated and utilized to allow for the ability to efficiently recognize and highlight objects of interest within images. The compact representation of an object of interest provided by the digital signature may therefore provide a technical advantage in terms of storage efficiency and the speed and efficiency with which digital signatures representative of objects of interest may be retrieved and processed, such as in conjunction with the identification of an object of interest within a query image.

The signature encoding module 20 and the query processing module 22 may be trained concomitantly in some example embodiments, such as by being trained concurrently. Alternatively, one of the signature encoding module and the query processing module may have been previously trained and only the other one of the signature encoding module and the query processing module is trained, utilizing the one that has been previously trained. Still further, the signature encoding module and the query processing module may be trained in an intermittent manner in which the signature encoding module is initially trained and the signature encoding module, as trained, may then remain static while the query processing module is trained. The signature encoding module could then again be further trained while the query processing module remains static, and so on in an iterative manner. In any instance, the training of the signature encoding module and the query processing module is interdependent.

Figure 4:
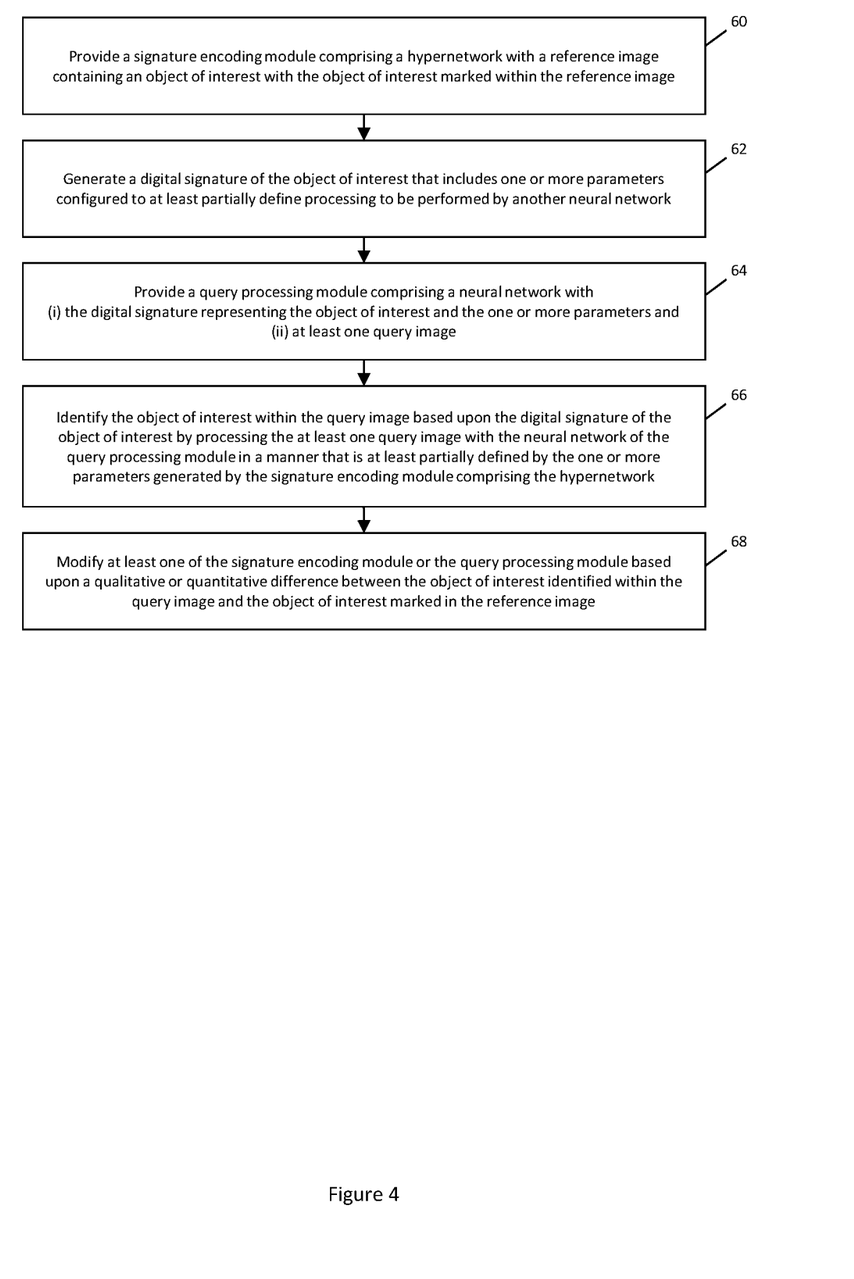
FIG. 4 is a flowchart illustrating the operations performed, such as by the apparatus of FIG. 1, in order to train a signature encoding module and a query processing module in accordance with an example embodiment.

Referring now to FIG. 4, the operations performed, such as by the apparatus 10 of FIG. 1, in order to train at least one of a signature encoding module 20 or a query processing module 22 and, by way of a more specific example, to concomitantly train both the signature encoding module 20 and the query processing module 22 are depicted. As shown in block 60 of FIG. 4 and as described above in conjunction with block 30 of FIG. 2, the apparatus 10 of this example embodiment includes means, such as the processing circuitry 12, memory 14, the signature encoding module 20, and/or the like, for providing the signature encoding module comprising a hypernetwork 21 with a reference image depicting an object of interest and having the object of interest marked within the reference image. As shown in block 62 of FIG. 4 and as described above in conjunction with block 32 of FIG. 2, the apparatus 10 of this example embodiment includes means, such as the processing circuitry 12, memory 14, the signature encoding module 20, and/or the like, for generating a digital signature of the object of interest. The digital signature generated by the signature encoding module comprising the hypernetwork also comprises one or more parameters configured to at least partially define processing to be performed by another neural network, such as one or more weights to be utilized by a neural network 23 of the query processing module.

As shown in block 64 of FIG. 4 and as described above in conjunction with block 34 of FIG. 2, the apparatus 10 of this example embodiment includes means, such as the processing circuitry 12, memory 14, the signature encoding module 20, and/or the like, for providing the query processing module 22 comprising a neural network 23 with (i) the digital signature representing the object of interest and the one or more parameters and (ii) at least one query image. Further, as shown in block 66 of FIG. 4 and as described above in conjunction with block 36 of FIG. 2, the apparatus 10 of this example embodiment includes means, such as the processing circuitry 12, memory 14, the query processing module 22, and/or the like, for identifying the object of interest within the query image based upon the digital signature of the object of interest. In this example embodiment, the query processing module is configured to identify the object of interest by processing the at least one query image with its neural network with the processing provided by the neural network being at least partially defined by the one or more parameters generated by the signature encoding module 20 comprising the hypernetwork 21 and provided via the digital signature.

Once the object of interest has been identified in the query image, at block 68, the apparatus 10 includes means, such as the processing circuitry 12, memory 14, the signature encoding module 20, the query processing module 22 and/or the like, for modifying at least one of the signature encoding module or the query processing module based upon a qualitative or quantitative difference between the object of interest identified within the query image and the object of interest marked in the reference image. For example, the apparatus may include means, such as the processing circuitry or the like, for comparing the object of interest identified within the query image and the object of interest marked in the reference image using an objective function, such as a cost function or a loss function, with at least one of the signature encoding module or the query processing module then being modified based upon a result of the objective function. In some embodiments, at least one of the signature encoding module and the query processing module may be modified to reduce a qualitative or quantitative difference between the object of interest identified within the query image and the object of interest marked in the reference image.

By repeating the foregoing process a plurality of times by providing the signature encoding module 20 with a reference image with an object of interest being marked therein and then utilizing the resulting digital signature as an input along with one or more query images to the query processing module 22 and then modifying the signature encoding module and/or the query processing module based upon a qualitative or quantitative difference between the object of interest identified within the query image and the object of interest marked in the reference image, the signature encoding module and the query processing module may be trained to perform more accurately. In this regard, the signature encoding module may be trained to generate digital signatures that permit an object to interest to be accurately identified, and the query processing module may be trained to accurately identify the object of interest based upon a digital signature representative of the object of interest and, in some embodiments, at least some of the context associated therewith.

By appropriately training the signature encoding module 20 and the query processing module 22 to generate digital signatures representative of objects of interest and to identify an object of interest from a query image utilizing a digital signature of the object of interest, respectively, objects of interest may be reliably identified from images based upon digital signatures of the objects of interest. Thus, a database of digital signatures of various objects of interest may be maintained, thereby providing for efficient storage of information associated with a wide variety of objects of interest without necessarily having to store the corresponding images. By utilizing the digital signatures, the objects of interest may subsequently be identified in query images in a manner that conserves processing resources and is more timely than at least some other image analysis techniques. Moreover, by including a functional component in terms of the one or more parameters within the digital signature, the encoding of the digital signature may be improved, such as to better handle invariances within the image, such as pose, scale, lighting, weather and/or occlusion, and/or to improve compression of the image. As a result, the method, apparatus and computer program product of an example embodiment may be trained to more accurately identify an object of interest within a query image, thereby allowing for improved augmentation of the resulting image and an improved user experience.

FIGS. 2-4 illustrate flow diagrams depicting a method according to an example embodiment of the present invention. It will be understood that each block of the flow diagrams and combination of blocks in the flow diagrams may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an embodiment of the present invention and executed by the processing circuitry 12. As will be appreciated, any such computer program instructions may be loaded onto a computer or other programmable apparatus (for example, hardware) to produce a machine, such that the resulting computer or other programmable apparatus implements the functions specified in the blocks of the flow diagrams. These computer program instructions may also be stored in a computer-readable memory that may direct a computer or other programmable apparatus to function in a particular manner, such that the instructions stored in the computer-readable memory produce an article of manufacture the execution of which implements the function specified in the blocks of the flow diagrams. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the blocks of the flow diagrams.

Accordingly, blocks of the flow diagrams support combinations of means for performing the specified functions and combinations of operations for performing the specified functions for performing the specified functions. It will also be understood that one or more blocks of the flow diagrams, and combinations of blocks in the flow diagrams, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. For example, although a supervised learning technique has been described in conjunction with the training of the signature encoding module 20 and the query processing module 22, various forms of unsupervised learning or partially supervised learning may, instead, be employed in other example embodiments. Therefore, it is to be understood that the inventions are not to be limited to the specific embodiments disclosed and that modifications and other embodiments are intended to be included within the scope of the appended claims. Furthermore, in some embodiments, additional optional operations may be included. Modifications, additions, or amplifications to the operations above may be performed in any order and in any combination.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for generating and utilizing a digital signature to identify an object of interest, the method comprising:
   providing a reference image depicting the object of interest to a signature encoding module comprising a hypernetwork, wherein an indication of the object of interest within the reference image is also provided;
   generating, with the signature encoding module, the digital signature representing the object of interest, wherein the digital signature generated by the signature encoding module comprising the hypernetwork also comprises one or more parameters configured to at least partially define processing to be performed by another neural network;
   providing (i) the digital signature representing the object of interest and the one or more parameters and (ii) at least one query image to a query processing module comprising a neural network; and
   identifying, by the query processing module, the object of interest within the at least one query image based upon the digital signature of the object of interest, wherein identifying the object of interest comprises processing the at least one query image with the neural network of the query processing module with the processing being at least partially defined by the one or more parameters generated by the signature encoding module comprising the hypernetwork.

2. A method according to claim 1 wherein the one or more parameters generated by the signature encoding module comprising the hypernetwork comprise one or more weights to be utilized by the neural network of the query processing module.

3. A method according to claim 2 wherein the neural network of the query processing module comprises a plurality of neural network layers, and wherein processing the at least one query image with the neural network of the query processing module utilizing the one or more weights in predefined layers of the neural network.

4. A method according to claim 1 wherein the one or more parameters generated by the signature encoding module comprising the hypernetwork comprise one or more parameters configured to at least partially define a number of layers of the neural network of the query processing module that process the at least one query image.

5. A method according to claim 1 wherein the one or more parameters generated by the signature encoding module comprising the hypernetwork comprise one or more parameters configured to specify that the neural network of the query processing module is to perform additional image processing of the at least one query image.

6. A method according to claim 1 wherein the neural network of the query processing module also comprises a hypernetwork, and wherein processing the at least one query image comprises modifying one or more parameters of the hypernetwork of the query processing module based upon the at least one query image.

7. A method according to claim 6 wherein modifying one or more parameters of the hypernetwork of the query processing module comprises modifying one or more weights utilized by the neural network of the query processing module based upon the at least one query image.

8. A method according to claim 1 wherein generating the digital signature comprises generating the digital signature representing the object of interest and at least some context associated with the object of interest in the reference image.

9. A method according to claim 1 further comprising augmenting the at least one query image based upon the object of interest identified therein.

10. An apparatus configured to generate and utilize a digital signature to identify an object of interest, the apparatus comprising:
    a processing circuitry including;
    a signature encoding module comprising a hypernetwork, the signature encoding module configured to receive a reference image depicting the object of interest, wherein an indication of the object of interest within the reference image is also received, the signature encoding module also configured to generate the digital signature representing the object of interest, wherein the digital signature generated by the signature encoding module comprising the hypernetwork also comprises one or more parameters configured to at least partially define processing to be performed by another neural network; and
    a query processing module comprising a neural network and configured to receive (i) the digital signature representing the object of interest and the one or more parameters and (ii) at least one query image, wherein the query processing module is also configured to identify the object of interest within the at least one query image based upon the digital signature of the object of interest, wherein the query processing module is configured to identify the object of interest by processing the at least one query image with the neural network with the processing being at least partially defined by the one or more parameters generated by the signature encoding module comprising the hypernetwork.

11. An apparatus according to claim 10 wherein the one or more parameters generated by the signature encoding module comprising the hypernetwork comprise one or more weights to be utilized by the neural network of the query processing module.

12. An apparatus according to claim 11 wherein the neural network of the query processing module comprises a plurality of neural network layers, and wherein the query processing module is configured to process the at least one query image with the neural network utilizing the one or more weights in predefined layers of the neural network.

13. An apparatus according to claim 10 wherein the one or more parameters generated by the signature encoding module comprising the hypernetwork comprise one or more parameters configured to at least partially define a number of layers of the neural network of the query processing module that process the at least one query image.

14. An apparatus according to claim 10 wherein the one or more parameters generated by the signature encoding module comprising the hypernetwork comprise one or more parameters configured to specify that the neural network of the query processing module is to perform additional image processing of the at least one query image.

15. An apparatus according to claim 10 wherein the neural network of the query processing module also comprises a hypernetwork, and wherein the query processing module is configured to process the at least one query image by modifying one or more parameters of the hypernetwork of the query processing module based upon the at least one query image.

16. An apparatus according to claim 15 wherein the query processing module is configured to modify one or more parameters of the hypernetwork of the query processing module by modifying one or more weights utilized by the neural network of the query processing module based upon the at least one query image.

17. An apparatus according to claim 10 wherein the signature encoding module is configured to generate the digital signature by representing the object of interest and at least some context associated with the object of interest in the reference image.

18. An apparatus according to claim 10 further comprising processing circuitry configured to augment the at least one query image based upon the object of interest identified therein.

19. A method for training at least one of a signature encoding module and a query processing module, the method comprising:
- providing the signature encoding module comprising a hypernetwork with a reference image depicting an object of interest and having the object of interest marked within the reference image;
- generating a digital signature of the object of interest, wherein the digital signature generated by the signature encoding module comprising the hypernetwork also comprises one or more parameters configured to at least partially define processing to be performed by another neural network;
- providing the query processing module comprising a neural network with (i) the digital signature representing the object of interest and the one or more parameters and (ii) at least one query image;
- identifying the object of interest within the query image based upon the digital signature of the object of interest, wherein identifying the object of interest comprises processing the at least one query image with the neural network of the query processing module with the processing being at least partially defined by the one or more parameters generated by the signature encoding module comprising the hypernetwork; and
- modifying at least one of the signature encoding module or the query processing module based upon a qualitative or quantitative difference between the object of interest identified within the query image and the object of interest marked in the reference image.

20. A method according to claim 19 wherein the one or more parameters generated by the signature encoding module comprising the hypernetwork comprise one or more weights to be utilized by the neural network of the query processing module.

* * * * *

UNITED STATES PATENT AND TRADEMARK OFFICE
CERTIFICATE OF CORRECTION

| | | |
|---|---|---|
| PATENT NO. | : 11,991,295 B2 | Page 1 of 1 |
| APPLICATION NO. | : 17/544039 | |
| DATED | : May 21, 2024 | |
| INVENTOR(S) | : Ofer Melnik | |

It is certified that error appears in the above-identified patent and that said Letters Patent is hereby corrected as shown below:

In the Claims

In Column 24, Line 7, Claim 10, delete "including;" and insert -- including: --, therefor.

Signed and Sealed this
Twenty-first Day of January, 2025

Coke Morgan Stewart
*Acting Director of the United States Patent and Trademark Office*